Sept. 30, 1969     L. G. SIMJIAN     3,469,521
APPARATUS FOR PREPARING A BEVERAGE
Filed March 15, 1966     3 Sheets-Sheet 1

INVENTOR
Luther G. Simjian
BY
Erwin B. Steinberg
AGENT.

Sept. 30, 1969  L. G. SIMJIAN  3,469,521
APPARATUS FOR PREPARING A BEVERAGE
Filed March 15, 1966  3 Sheets-Sheet 2

INVENTOR.
Luther G. Simjian
BY
Ervin B. Steinberg
AGENT.

Sept. 30, 1969   L. G. SIMJIAN   3,469,521
APPARATUS FOR PREPARING A BEVERAGE
Filed March 15, 1966   3 Sheets-Sheet 3
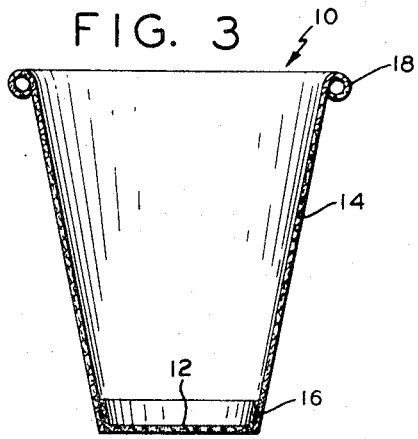
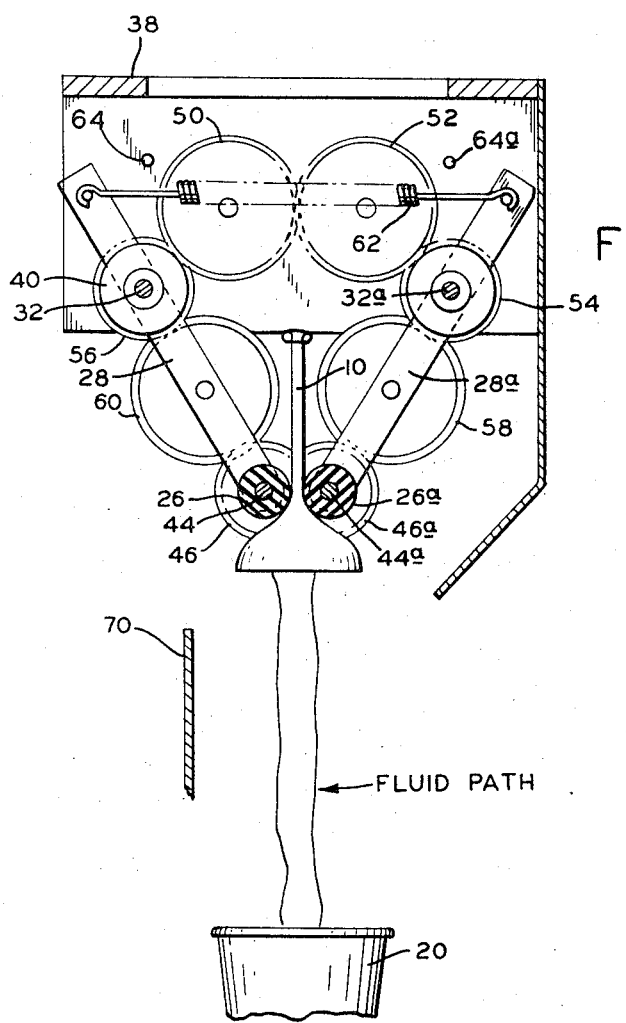
Luther G. Simjian
INVENTOR.
BY Ervin B. Steinberg
AGENT.

United States Patent Office 3,469,521
Patented Sept. 30, 1969

3,469,521
APPARATUS FOR PREPARING A BEVERAGE
Luther G. Simjian, Laurel Lane,
Greenwich, Conn. 06830
Filed Mar. 15, 1966, Ser. No. 534,535
Int. Cl. A47j 31/00
U.S. Cl. 99—287                         10 Claims

ABSTRACT OF THE DISCLOSURE

A beverage brewing apparatus uses a single-use infusion container having a filter bottom portion and water impervious side walls. After depositing the beverage substance (coffee powder) and water in the infusion container, the side walls are flexed toward each other to provide a closure and then rollers engaging the walls continue to reduce the container volume, the pressure exerted upon the liquid forcing the brewed beverage through the filter bottom into another dispensing container. The used infusion chamber is removed to a waste receptacle.

---

This invention refers to a method and apparatus for preparing a beverage and, more specifically, concerns a method and apparatus for preparing a beverage using a solid beverage substance which is steeped in a liquid. Quite specifically, the present invention concerns a method and apparatus for preparing a drink, such as coffee or tea, by the infusion process.

The prior art discloses a great variety of methods and automatic apparatus, particularly those for coffee brewing. Generally, an infusion chamber is provided and the brewed beverage is extracted therefrom, the infusion chamber being dimensioned for brewing coffee on a batch basis, e.g. ten cups at a time, or more recently on an individual cup basis. Several significant factors need to be considered in the design and operation in such machines, particularly the uniformity, the quality and the taste of the beverage during extended use of the machine, and quite importantly the amount of rinse water required to flush the infusion chamber and the associated parts after each cycle of operation. The latter feature is of considerable concern in automated installations in which the rinse waste must be stored and emptied manually, typically once a day. Insufficient rinsing of the infusion chamber, particularly in the case of coffee brewing apparatus, causes a very rapid deterioration of the drinks due to the oily and rancid residue of the coffee grinds, while excessive rinsing necessitates the use of large waste tanks followed by increased labor and service time and cost for emptying and cleaning the storage tanks. Also, in order to provide an effective rinsing action after each brewing cycle, the rinse water needs to be hot, preferably boiling.

Moreover, in order to perform a good and thorough sanitizing job on the brewing or infusion chamber and the associated parts, certain chemicals are used which frequently leave a taste which can be discerned in the drinks prepared immediately thereafter.

The present method and apparatus overcomes the above stated shortcomings of the prior arrangements by providing a single-use, disposable or throw-away container which serves as the infusion chamber. In this manner no rinse water is needed, thereby eliminating both the extra hot water requirements as well as the large waste storage receptacles needed in most installations. Moreover, the machine constructed in accordance with the teachings disclosed hereafter is cleaner and more sanitary since the cleanliness of the machine does not depend upon the temperature of the rinse water, or upon the amount and the effectiveness thereof. Last but not least, due to the use of a fresh infusion chamber for each cycle of operation, the quality of the beverage remains substantially constant and is not subject to the steady deterioration which is experienced with currently existing machines as these machines go through their many operating cycles between periods of cleaning.

In accordance with my invention, which will be described hereafter more fully, a single-use throw-away infusion chamber is used which comprises a container having a filter portion and a flexible liquid impervious portion. This container is filled with boiling water and a beverage substance, such as coffee grinds. Subsequently, the impervious portion of the container is flexed in such a manner as to exert pressure upon the liquid whereby the liquid is forced from the container through its filter portion. The filtered liquid, constituting the beverage, is collected in a second container, for instance a drinking cup. The flexed infusion chamber which has been squeezed to the extent that the beverage substance is substantially the only material remaining in this container is then removed to a waste receptacle and a new container is used for the next cycle of operation.

One of the principal objects of this invention is, therefore, the provision of a new and improved apparatus for preparing a beverage, avoiding one or more of the limitations and disadvantages of the prior art devices.

Another important object of this invention is the provision of a novel apparatus for preparing a beverage, eliminating the need for a rinse supply and a water or vapor rinse cycle.

Another object of this invention is the provision of a new and improved apparatus for preparing a beverage, such as tea or coffee, using a single-use, throw-away infusion container.

A further object of this invention is to provide an apparatus which employs a container having a filter portion and a flexible liquid impervious portion, the liquid impervious portion being adapted to be flexed in order to cause liquid which is confined in the container to be forced from said container through said filter portion.

A still further and other object of this invention is the provision an apparatus for brewing a beverage employing a single-use, throw-away infusion container which is fitted with flexible side walls which, when the container is filled, are subjected to flexing so as to confine the beverage therein and subsequently forcing the liquid from the container whereby the beverage substance, such as coffee grinds or tea leaves, is retained in the container and removed with the container to a waste storage receptacle.

Further and still other objects of this invention will be apparent by reference to the following description when taken in conjunction with the accompanying drawings in which:

FIGURE 3 is a vertical section through a container which may be used for my invention; and FIGURE 4 is a view showing a typical condition of the infusion container during the process of flexing the side walls thereof, using the apparatus per FIGURES 1 and 2.

Referring now to the figures and FIGURE 3 in particular, a disposable single-use infusion container 10 is shown. The container has a water permeable filter portion 12 and a water impervious flexible side portion 14. The filter portion 12 may be made of standard commercially available filter paper while the flexible side portion may be made of coated paper stock or plastic material, for instance polyethylene. Both portions are joined along a seam line 16. Sealing may be accomplished either by a bond using thermoplastic or thermosetting material, or alternatively using ultrasonic sealing techniques. The container 10 at its upper end is provided also with a rolled bead 18 which serves as a support when the container is used in conjunction with the mechanism per FIGURES 1 and 2.

While the container 10 shown in FIGURE 3 is of conventional truncated cone shape, it will be apparent that other container shapes may be used, e.g. rectangular, bag shape, oblong, etc. It should be understood also that these containers may be stored in a magazine in a flat condition and be set up individually just prior to use. Typical of this latter embodiment are containers comprising flat circular disks having a water pervious central portion, each disk being removed individually from the stack and formed into a cylindrical or conical shape immediately prior to use. Alternatively, bag type containers may be stored folded and set up, using air pressure for unfolding.

Figure 1:
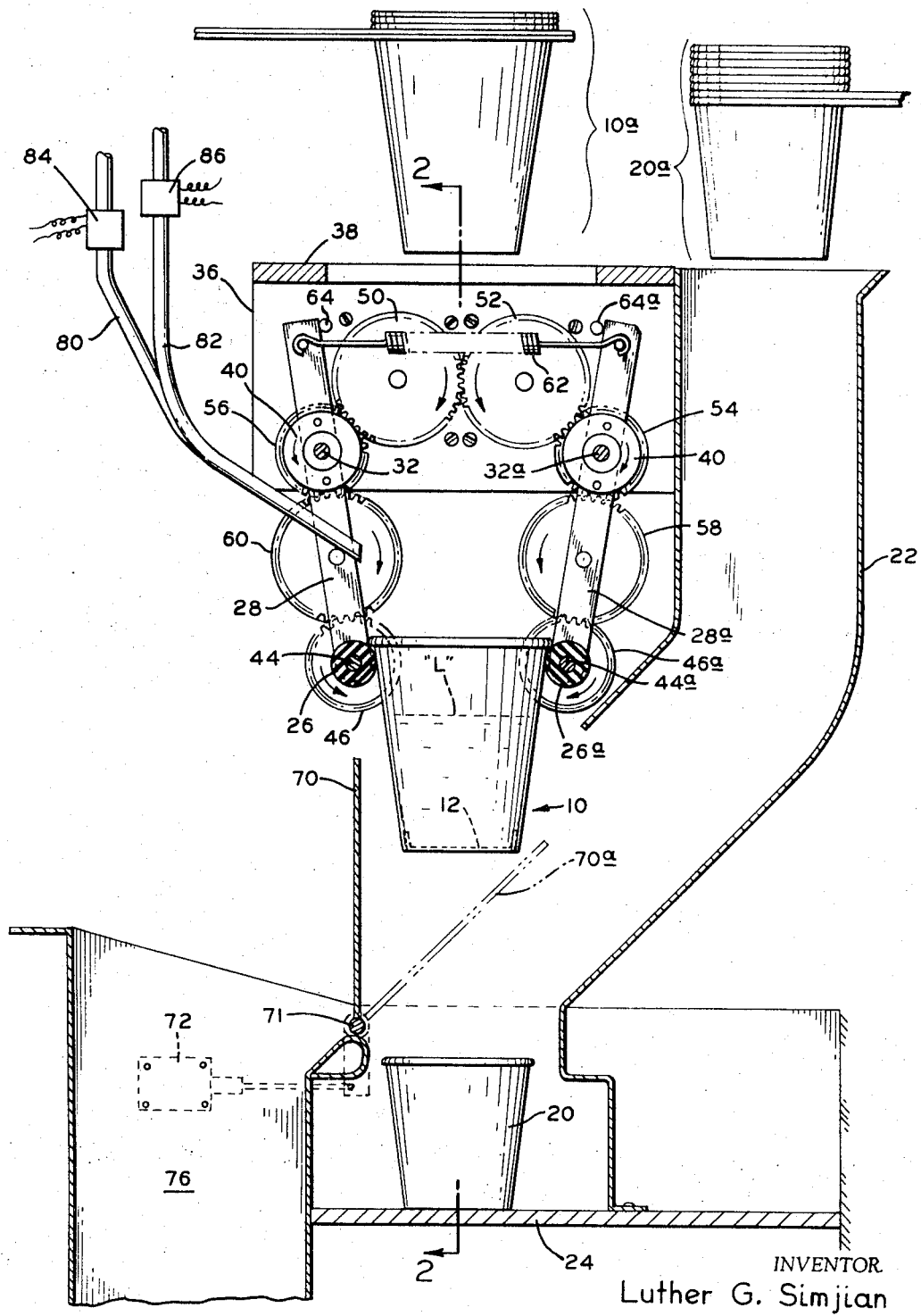
FIGURE 1 is a vertical sectional view, taken along line 1—1 in FIGURE 2, showing a typical embodiment of the apparatus for practicing the invention.
Figure 2:
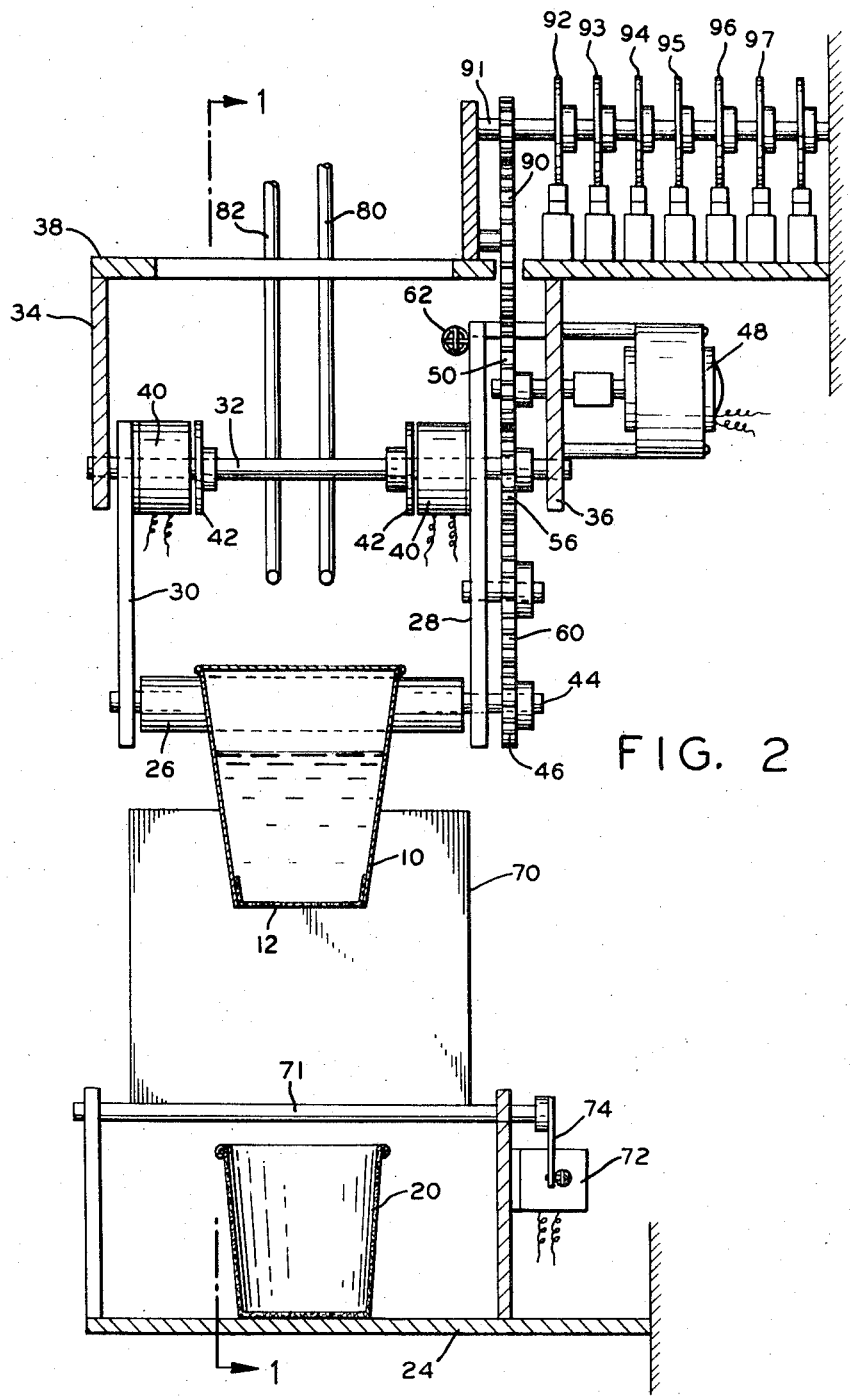
FIGURE 2 is a sectional view, taken along line 2—2 in FIGURE 1.

FIGURES 1 and 2 depict a typical mechanism for using the disposable containers per FIGURE 3, such mechanism being adapted for incorporation in an automatic vending machine for dispensing cups of coffee, tea and the like. The normally provided enclosure, access door, coin acceptance means, manual selection means, water connections, etc. have been omitted as those mechanisms are well understood and do not form a part of the invention.

Referring now to FIGURES 1 and 2, a supply of infusion containers 10 is shown in stacked form, one inside the other, at 10a. A supply 20a of conventional drinking cups or containers 20 is shown also, each of the latter drinking cups or containers being typically of truncated cone shape and made of paper or plastic material. Both containers are dispensed into the beverage preparation mechanism by conventional means, not shown in detail herein, but which consist essentially of scissoring arms in pairs, the upper arm holding the respective stack less one container which is held by the lower arm until dispensed. Mechanisms of this type are well understood and commonly employed in automatic vending machines. The container 10 is larger than the container 20 as will be seen more clearly hereafter.

A container 20, when released from the stack 20a, falls through the chute 22 and comes to a rest on a support plate 24. The container 10, when released from the stack 10a, falls to a point just below its rolled bead 18 where its tapered side portion is engaged by a pair of rubber rollers 26 and 26a. These rollers are mounted to the lower ends of a pair of arms 28 and 28a and a similar opposite pair of arms 30 and 30a, arm 30a being not visible. The arms are mounted for pivotal motion on a set of shafts 32 and 32a which are journalled respectively in plates 34 and 36 which, in turn, are supported by a bracket 38.

Located on the shafts 32 and 32a are electromagnetic clutches 40. The body of each clutch containing the electromagnetic coil, is fastened respectively to the arms 28, 28a, 30 and 30a. The armature 42 of the clutches is pinned to the respective shafts and, when the clutches are energized, the clutching action tends to lock the shafts 32 and 32a to the arms 28, 28a, 30 and 30a to the extent of the friction between the armature and the coil. The rubber rollers 26 and 26a are mounted respectively on shafts 44 and 44a and are rotated by gears 46 and 46a respectively.

Located on the plate 36 is an electric motor 48 with the motor shaft extending through the plate and carrying a gear 50 which meshes with a gear 52 located on a stub shaft extending from the plate 36. The gear 52 meshes with a gear 54 affixed to the shaft 32a, an idler gear 58 attached to the arm 28a and a gear 46a. In a like manner, the gear 50 meshes with the gear 56 and drives gears 60 and 46.

At the upper end of the arms 28 and 28a are disposed pins between which a tension spring 62 is attached. The spring biases the arms 28 and 28a against the stops 64 and 64a.

When the motor 48 is energized, it drives the gears in the direction indicated by the arrows on each gear. The clutches 40 are energized also and cause the arm 28 to pivot in a counter-clockwise direction about the shaft 32, while arm 28a is caused to pivot in a clockwise direction about the shaft 32a. The rollers 26 and 26a, therefore, move inward to flex the impervious portion 14 of the container 10, thereby confining the beverage, which is provided by fill means to be described later, between the container portion flexed by the rollers and the filter portion 12. This action closes the upper part of the container 10 just underneath the bead 18, thus permitting the liquid to escape solely via the filter portion 12 to the cup 20 as subsequently force is exerted upon the liquid by reducing the volume of the container 10.

When the rollers 26 and 26a have tightly pinched the upper flexible portion of the container 10, the friction of the clutches 40 maintains the pressure on the container and the gears now cause the rollers 26 and 26a to rotate so as to force the container 10 upward through the rollers. The liquid is forced to escape through the liquid permeable filter portion 12 of the cup 10 and is collected in the container 20. This action is shown schematically in FIGURE 4 wherein the partially pinched container 10 is shown flattened and being fed through the rollers. The illustration shows substantially the final shape.

Located at the lower portion of the mechanism, FIGURES 1 and 2, is a deflector 70, mounted upon a shaft 71, which can be rotated to the two positions shown, i.e. the normal vertical position depicted by the solid lines and the alternate inclined position shown by the dashed lines 70a. A solenoid 72 via a crank arm 74 coupled to the shaft 71 provides this pivotal motion.

When the rollers 26 and 26a have extracted substantially all of the liquid from the flexed and flattened container 10, the motor 48 is stopped and the clutches 40 are de-energized and, simultaneously therewith, the solenoid 72 is energized. The tension spring 62 biases the arms back to the stops 64 and 64a, thus allowing the flattened container 10 to fall upon the now inclined deflector 70 disposed at position 70a. The deflector shunts the crushed and flattened container 10 with beverage residue confined therein to the side and into a waste chute and receptacle 76. Subsequently, the solenoid 72 is de-energized, returning the deflector to its normal position as is shown by the solid lines. The entire device is ready for another cycle of operation.

Shown in FIGURE 1 at the upper left are sanitary hose lines 80 and 82 disposed to provide the beverage ingredients to the infusion container 10. Solenoid valves 84 and 86 are used to control the dispensation of these materials. The dispensing of solid beverage substances, such as coffee grinds or tea leaves, or sugar, and of liquids, such as hot or cold water, cream, etc. into the container 10 is well understood and is accomplished by conventional means. Alternatively, it shall be understood that the present mechanism will operate also with an arrangement wherein each container 10 is provided in advance with a suitable amount of solid beverage substance and only the liquid is added during the brewing operation. Such solid beverage substance may be confined in a water pervious double bottom of container 10. Alternatively, such substance may be added as a package in the form of "tea bags."

Located on the plate 38 are a series of control cams and associated electrical circuit switches which are operated by these cams. The cams, representing timing cams, are mounted on a common shaft 91 and are driven by the motor 48 through an idler gear 90. The ratio between the motor and the cam shaft 91 is such that the cam shaft 91 makes one revolution for each cycle of operation. The cams and their associated electrical switches are numbered 92 through 97. The cam 92 and its associated switch are arranged so that when the motor 48 is started by a coin operated switch or any other suitable control means, not shown, the motor 48 runs for one complete cycle, i.e. one revolution of the cam shaft 91. The cams and associated switches control the following functions, all in proper sequence: cam 93 causes the release of the containers 10 and 20 from their respective stacks, cam 94 causes dispensing of the beverage substance, cam 95 dispensing of the liquid, cam 96 energizes the clutches 40, and cam 97 operates the solenoid 72. Additional timing cams may be provided for other functions as needed. Control means of this type are well understood and do not form per se a feature of this invention. Instead of timing cams, relays or electronic timing means can be substituted to control the operation of the various functions.

SUMMARY OF OPERATION

Operation of the foregoing method and apparatus may be summarized as follows: A supply of first containers, each having a filter portion and a water impervious portion, is provided in a storage means at 10a, while a supply of second containers is provided in a storage means 20a. Upon starting operation, a container 10 is released from the storage stack and dropped to a position between the rollers 26 and 26a and retained thereat. Simultaneously, a second container 20 is released from its stack and dropped on the support plate 24 so that the container 20 is disposed underneath the container 10.

Next, the container 10, serving as an infusion chamber, is filled with the solid beverage substance and the liquid. When this is accomplished—with or without delay for steeping—the motor 48 is energized which, in turn, actuates the clutches 40. The rollers 26 and 26a, acting as pinch rollers, move inward, pinching the container side above the liquid level L, thereby closing the container and confining the liquid between the closed upper container portion and the lower filter portion 12. The volume of the container holding the liquid is reduced gradually as the container 10, partially flattened is driven upward between the rollers 26 and 26a, thus forcing the liquid from the container 10 through the filter portion 12 into the container 20. When substantially all of the liquid has been extracted, the clutches are de-energized, simultaneously the solenoid 72 is actuated, thus releasing the flattened container 10 and causing the expended container 10 to fall upon the deflector 70, now disposed at its inclined position. The container 10 therefore reaches the waste receptacle 76 and is not re-used or available for the next cycle. Subsequently, the deflector 70 is restored to its vertical position and the timing mechanism is stopped, being ready for another cycle of operation. The container 20, containing the brewed beverage or drink, is available to the patron for withdrawal from the apparatus.

Hence, it will be apparent that the foregoing apparatus overcomes the need for rinsing the machine after each cycle of operation. The apparatus described heretofore remains clean and free of the residue and contamination usually found, thus providing not only drinks of uniform quality, but also offering advantages and conveniences not present in the prior art devices. The squeezed and crushed container 10 may be collected in a water-proof bag disposed within the waste receptacle 76, thus speeding up and simplifying servicing of the machine and obviating the need for further cleaning.

An alternative container wall deflecting and squeezing means which may be substituted for the roller mechanism shown and described comprises a pair of opposed rockers which first close toward each other and then go through a rocking motion to force the liquid to escape through the bottom filter portion.

As depicted in FIGURES 1, 2 and 4, the container 10 is maintained in a completely vertical position during the extracting cycle. It will be apparent that as soon as the upper end of the container is closed, the container may be tilted, if so desired.

What is claimed is:
1. An apparatus for preparing a beverage comprising:
 means for supporting a container having a filter portion and a fixible liquid impervious portion;
 means for filling said container with a beverage substance and liquid;
 means for engaging said fixible impervious container portion for flexing it and exerting pressure upon the liquid whereby to force the liquid from said container through said filter portion; and
 control means coupled to said means for filling and to said means for engaging said container to control the sequential operation of said respective means.

2. An apparatus for preparing a beverage as set forth in claim 1 and including means for supporting a second container which collects the liquid forced from said first container.

3. An apparatus as set forth in claim 1 and including a means for causing said container to be moved to a waste receptacle after the liquid has been forced therefrom in response to the operation of said engaging means, whereby to render said first receptacle unavailable for re-use.

4. An apparatus as set forth in claim 1, said means for engaging said flexible portion and exerting pressure initially confining said liquid solely between said filter portion and a portion of said impervious portion, and subsequently progressively flexing and pinching said impervious portion containing the liquid to reduce the volume occupied by the liquid, thereby forcing the liquid through said filter portion.

5. An apparatus as set forth in claim 4 wherein said means for engaging said flexible portion comprises roller means.

6. An apparatus as set forth in claim 4 wherein said means for engaging said flexible portion comprises a set of rollers and includes drive means for operating said rollers to initially flex and pinch said impervious portion and subsequently feeding the pinched portion between said rollers.

7. An apparatus for preparing a beverage comprising:
 means for storing a supply of first containers, each such first container having a filter portion and a flexible liquid impervious portion;
 means for storing a supply of second containers;
 means for dispensing a second container from the respective storage means and disposing it on a support means;
 means for dispensing a first container from the respective storage means and disposing it above said second container;
 means for filling said first container with a beverage substance and water;
 means for engaging said flexible impervious portion for closing it and flexing it whereby to exert pressure upon the liquid confined in said first container, causing the liquid to be forced from said first container through said filter portion to fill said second container;
 means for removing said first container from its position above said second container subsequent to it having been flexed and substantially emptied of water; and
 control means coupled to said means for dispensing said first and second containers, to said means for engaging and flexing said container, and to said filling, to said means for engaging and flexing said container, and to said means for removing said container for causing the sequential operation of said respective means.

8. An apparatus for preparing a beverage as set forth in claim 7 wherein said means for engaging said impervious portion comprises means for first closing said container by pinching said first container side portion disposed above the liquid level of the water in said container and then advancing the engaging means along said first container toward said filter portion.

9. An apparatus for preparing a beverage as set forth in claim 7 wherein said means for removing said first container comprises means for releasing said container from engagement by said means for engaging, and a movable deflector plate for guiding said released container to a waste receptacle.

10. An apparatus for preparing a beverage as set forth in claim 7 wherein said second container is a drinking cup.

References Cited
UNITED STATES PATENTS

| | | | |
|---|---|---|---|
| 2,743,664 | 5/1956 | Dale | 99—295 |
| 3,120,440 | 2/1964 | Ross | 99—289 X |
| 3,292,527 | 12/1966 | Stasse | 99—295 |
| 3,354,811 | 11/1967 | King | 99—289 X |

ROBERT W. JENKINS, Primary Examiner

U.S. Cl. X.R.

99—295